US010954150B2

(12) United States Patent
Wallace

(10) Patent No.: US 10,954,150 B2
(45) Date of Patent: Mar. 23, 2021

(54) SYSTEM FOR REMOVING MINERALS FROM A BRINE

(71) Applicant: Enviro Water Minerals Company, Inc., Houston, TX (US)

(72) Inventor: Paul Steven Wallace, Katy, TX (US)

(73) Assignee: Enviro Water Minerals Company, Inc., Houston, TX (US)

(*) Notice: Subject to any disclaimer, the term of this patent is extended or adjusted under 35 U.S.C. 154(b) by 0 days.

(21) Appl. No.: 16/532,109

(22) Filed: Aug. 5, 2019

(65) Prior Publication Data
US 2019/0359512 A1 Nov. 28, 2019

Related U.S. Application Data

(62) Division of application No. 14/552,351, filed on Nov. 24, 2014, now Pat. No. 10,370,275.
(Continued)

(51) Int. Cl.
*C02F 9/00* (2006.01)
*B01J 49/50* (2017.01)
(Continued)

(52) U.S. Cl.
CPC .............. *C02F 9/00* (2013.01); *B01D 61/04* (2013.01); *B01D 61/422* (2013.01); *B01D 61/44* (2013.01);
(Continued)

(58) Field of Classification Search
CPC ...... B01D 61/02; B01D 61/027; B01D 61/04; B01D 61/10; B01D 61/42; B01D 61/422;
(Continued)

(56) References Cited

U.S. PATENT DOCUMENTS 2,721,171 A 10/1955 Wilfred
2,793,183 A 5/1957 Thurman
(Continued)

FOREIGN PATENT DOCUMENTS

WO 2007094659 A1 8/2007

OTHER PUBLICATIONS

McDonald, M. R., McClintock, J. B., Amsler, C. D., Rittschoff, D., Angus, R. A., Orihuela, B. & Lutostankski, K., "Effects of Ocean Acidification Over the Life History of the Barnacle Amphibalanus Amphitrite," Marine Ecology Progress Series 385:179-187 (2009).
(Continued)

*Primary Examiner* — Katherine Zalasky McDonald
(74) *Attorney, Agent, or Firm* — Fletcher Yoder, P.C.

(57) ABSTRACT

A system includes an ion exchange softener fluidly coupled to a wastewater treatment system. The first ion exchange softener may receive a first brine stream from the wastewater treatment system and to remove a plurality of minerals from the first brine stream to generate a second brine stream including the plurality of minerals and a third brine stream. The system also includes a mineral removal system disposed downstream from the ion exchange softener and that may receive the second brine stream and to generate a sodium chloride (NaCl) brine stream and an acid and caustic production system disposed downstream from and fluidly coupled to the mineral removal system. The acid and caustic production system includes a first electrodialysis (ED) system that may receive the NaCl brine stream from the mineral removal system and to generate hydrochloric acid (HCl) and sodium hydroxide (NaOH) from the NaCl brine stream. The system also includes a second ED system disposed downstream from the ion exchange softener and upstream of the acid and caustic production system. The second ED system is fluidly coupled to the ion exchange softener and to the
(Continued)

acid and caustic production system, and the second ED may generate desalinated water from the third brine stream and an ED concentrate stream. The second ED system may direct the ED concentrate stream to the acid and caustic production system.

19 Claims, 4 Drawing Sheets

Related U.S. Application Data

(60) Provisional application No. 61/908,318, filed on Nov. 25, 2013.

(51) Int. Cl.

| | | |
|---|---|---|
| *B01D 61/42* | (2006.01) | |
| *B01D 61/58* | (2006.01) | |
| *B01D 61/44* | (2006.01) | |
| *B01D 61/04* | (2006.01) | |
| *C02F 1/42* | (2006.01) | |
| *C02F 1/44* | (2006.01) | |
| *C02F 1/00* | (2006.01) | |
| *C02F 1/28* | (2006.01) | |
| *C02F 1/469* | (2006.01) | |
| *C02F 1/76* | (2006.01) | |
| *C02F 5/00* | (2006.01) | |
| *B01D 61/02* | (2006.01) | |
| *C02F 103/08* | (2006.01) | |
| *C02F 101/10* | (2006.01) | |
| *C02F 103/00* | (2006.01) | |

(52) U.S. Cl.
CPC .............. *B01D 61/58* (2013.01); *B01J 49/50* (2017.01); *B01D 61/027* (2013.01); *B01D 2311/02* (2013.01); *B01D 2311/04* (2013.01); *B01D 2311/12* (2013.01); *B01D 2311/2623* (2013.01); *B01D 2311/2684* (2013.01); *C02F 1/001* (2013.01); *C02F 1/28* (2013.01); *C02F 1/42* (2013.01); *C02F 1/441* (2013.01); *C02F 1/442* (2013.01); *C02F 1/4693* (2013.01); *C02F 1/76* (2013.01); *C02F 5/00* (2013.01); *C02F 2101/101* (2013.01); *C02F 2101/103* (2013.01); *C02F 2103/001* (2013.01); *C02F 2103/08* (2013.01); *C02F 2209/06* (2013.01); *C02F 2209/44* (2013.01); *C02F 2303/04* (2013.01); *C02F 2303/16* (2013.01); *C02F 2303/22* (2013.01); *Y02A 20/124* (2018.01); *Y02A 20/131* (2018.01)

(58) Field of Classification Search
CPC .... B01D 61/58; B01D 61/44; B01D 2311/02; B01D 2311/04; B01D 2311/12; B01D 2311/26; B01D 2311/2623; B01D 2311/2684; C02F 1/28; C02F 1/441; C02F 1/76; C02F 1/42; C02F 1/469; C02F 1/4693; C02F 1/4604; C02F 1/58; C02F 1/44; C02F 1/442; C02F 1/68; C02F 1/001; C02F 9/00; C02F 5/00; C02F 2101/10; C02F 2101/101; C02F 2101/20; C02F 2101/206; C02F 2101/103; C02F 2303/22; C02F 2303/16; C02F 2103/001; C02F 2103/08; C02F 2209/06; C02F 2209/44; B01J 49/50; Y02A 20/134; Y02A 20/131
See application file for complete search history.

(56) References Cited

U.S. PATENT DOCUMENTS

| | | |
|---|---|---|
| 3,639,231 A | 2/1972 | Bresler |
| 4,127,235 A | 11/1978 | Klaile et al. |
| 4,163,046 A | 7/1979 | Subramanian et al. |
| 4,234,419 A | 11/1980 | Coillet |
| 4,298,442 A | 11/1981 | Giuffrida |
| 4,381,232 A | 4/1983 | Brown |
| 4,405,463 A | 9/1983 | Jost et al. |
| 4,436,429 A | 3/1984 | Strong et al. |
| 4,725,425 A | 2/1988 | Lesher et al. |
| 5,221,528 A | 6/1993 | Jongema |
| 5,250,185 A | 10/1993 | Tao et al. |
| 5,366,514 A | 11/1994 | Becnel, Jr. et al. |
| 5,417,491 A | 5/1995 | Hornung et al. |
| 5,476,591 A | 12/1995 | Green |
| 5,765,945 A | 6/1998 | Palmer |
| 5,814,224 A | 9/1998 | Khamizov et al. |
| 5,858,240 A | 1/1999 | Twardowski et al. |
| 5,925,255 A | 7/1999 | Mukhopadhyay |
| 6,030,535 A | 2/2000 | Hayashi et al. |
| 6,036,740 A | 3/2000 | Miller et al. |
| 6,183,644 B1 | 2/2001 | Adams et al. |
| 6,221,225 B1 | 4/2001 | Mani |
| 6,365,121 B1 | 4/2002 | Wurnbauer |
| 6,461,491 B1 | 10/2002 | Hryn et al. |
| 6,482,305 B1 | 11/2002 | Mani |
| 7,083,730 B2 | 8/2006 | Davis |
| 7,147,361 B2 | 12/2006 | Cecala et al. |
| 7,392,848 B1 | 7/2008 | Bader |
| 7,459,088 B2 | 12/2008 | Davis |
| 7,501,064 B2 | 3/2009 | Schmidt et al. |
| 7,595,001 B2 | 9/2009 | Arakel et al. |
| 7,744,760 B2 | 6/2010 | Wilkins et al. |
| 7,861,955 B2 | 1/2011 | Tracy et al. |
| 2007/0189945 A1 | 8/2007 | Kopp et al. |
| 2007/0284251 A1 | 12/2007 | Zuback et al. |
| 2008/0185340 A1 | 8/2008 | Bargeman et al. |
| 2008/0237123 A1 | 10/2008 | Marston |
| 2009/0127360 A1 | 5/2009 | Tracy et al. |
| 2010/0163471 A1 | 7/2010 | Elyanow et al. |
| 2011/0155665 A1 | 6/2011 | Cohen et al. |
| 2011/0198285 A1 | 8/2011 | Wallace |
| 2011/0289846 A1 | 12/2011 | Shaw et al. |
| 2011/0303607 A1 | 12/2011 | Vora et al. |
| 2012/0080376 A1 | 4/2012 | Komor et al. |

OTHER PUBLICATIONS

Markus Busch, William E. Mickols, Steve Jons, Jorge Redondo, Jean De Witte, "Boron Removal in Sea Water Desalination," International Desalination Association, BAH03-039 (2003).
NRS Engineering Water Solutions, "Final Pilot Study Report—Texas Seawater Desalination Demonstration Project," (Oct. 2008).
Collin Green "Using Gypsum for the Treatment of Mine Water," Department of Chemical and Metallurgical Engineering, Faculty of Natural Sciences, Technikon Pretoria (Dec. 2003).
Stephen R. Grattan "Irrigation Water Salinity and Crop Production," University of California, Davis—Agriculture and Natural Resources, ANR Publication 8066 (2002).
Ittai Gavrieli Amos Bein, and Aharon Oren, "The Expected Impact of the Peace Conduit Project (The Red Sea-Dead Sea Pipeline) on the Dead Sea," Mitigation and Adaptation Strategies for Global Change, 10:3-22 (2005).
DOW Water Solutions, "Filmtec™ Reverse Osmosis Membranes," Technical Manual, Form No. 609-00071; (2010) pp. 1-180.
DOW Water Solutions, "DOWTM Filmtec™ Membranes—DOW™ Filmtec™ SW30XLE-440i Seawater Reverse Osmosis Element with iLEC Interlocking Endcaps," Product Information. Form No. 609-03003-1109; (2010) pp. 1-2.
DOW Water Solutions, "DOW™ Filmtec™ Membranes—DOW™ Filmtec™ SW30ULE-440i Seawater Reverse Osmosis Element with iLEC™ Interlocking Endcaps," Product Information, Form No. 609-03004-1109; (2010) pp. 1-2.

(56) References Cited

OTHER PUBLICATIONS

DOW Water Solutions, "Filmtec™ Membranes—Filmtec™ XLE-440 Extra Low Energy RO Element," Product Information. Form No. 609-00245-0606; (2010) pp. 1-2.

DOW Water Solutions, "DOW™ Ultrafiltration—High Turbidity and Temperature Fluctuation No Obstacle for DOW™ Ultrafiltration," Case History, Form No. 795-00020-1108; (2010) pp. 1-5.

FAO Corporate Document Repository, Agriculture and Consumer Protection, "Water Quality for Agriculture"; http://www.fao.org/DOCREP/003/T0234E/TO234E05.htm (Feb. 10, 2010) pp. 1-15.

Seung-Hyun Kim, Jong-Sup Yoon, Seockheon Lee, "Utilization of Floc Characteristics for the Evaluation of Seawater Coagulation Process," Desalination and Water Treatment, Civil Engineering Department, Kyungnam University, Masan, Korea, 10 (2009) 95-100. *Presented at EuroMed 2008.

GE Water and Process Technologies, "Cloromat—Solution for Manufacturing Chlor-Alkali Chemicals: Sodium Hypochlorite, Hydrochloric Acid & Caustic Soda," Fact sheet (May 2008) p. 1-4.

GE Power & Water—Water & Process Technologies, "Hero" (2010) pp. 1-2.

ICL, "Harnessing Nature Creating Value," 3rd Annual NASDAQ-TASE Israeli Investor Conference, New York (Sep. 18, 2008) pp. 1-47.

Applied Membranes, Inc., "Water Treatment Guide—Temperature Correction Factor for Reverse Osmosis Membranes," (2007) pp. 1-2.

Nitto Denko and Hydranautics, "Chemical Pretreatment for RO and NF," Technical Application Bulletin No. 111, Revision C (Dec. 2008) pp. 1-16.

Chemical Processign.com, "To Avoid Silica-Scale Problems in Cooling Towers, Plant Personnel Turn to Unconventional Methods," Water Treatment's Gordion Knot; http://www.chemicalprocessing.com/articles/2003/235.html?page=print; (2003) pp. 1-9.

"Desalination: A National Perspective," Committee on Advancing Desalination Technology, National Research Council , The National Academies—Advisers to the Nation on Science, Engineering, and Medicine (2008) pp. 1-255.

Public Health and the Environment World Health Organization, "Desalination for Safe Water Supply—Guidance for the Health and Environmental Aspects Applicable to Desalination," Geneva (2007) pp. 1-173.

Gerald L. Mackie and Barb Crosbie, "Zebra Mussel Biofouling Control in Cottage and Other Small Volume Water Systems," The Georgian Bay Association (1999) pp. 1-87.

Ki-Won Baek, Sang-Hun Song, Seok-Hwan Kang, Young-Woo Rhee, Chang-Soo Lee, Bum-Jae Lee, Sam Hudson, and Taek-Sung Hwang, "Adsorption Kinetics of Boron by Anion Exchange Resin in Packed Column Bed," J. Ind. Eng. Chem., vol. 13, No. 3, (2007) 452-456.

EPA Selenium Purification_Scandium (1998) pp. 1-62.

Yoshinobu Tanaka, Reo Ehara, Sigeru Itoi, Totaro Goto, "Ion-exchange membrane electrodialytic salt production using brine discharged from a reverse osmosis seawater desalination plant," Journal of Membrane Science 222 (2003) 71-86.

Reclamation—Managing Water in the West, Desalination and Water Purification Research and Development Program Report No. 135, Pilot Testing of Zero-Discharge Seawater Desalination—Application to Selenium Removal from Irrigation Drainage, U.S. Department of the Interior Bureau of Reclamation, Apr. 2008, pp. 1-37.

Sallie J. Lee, Frank J. Liotta, Steven A. Schwartz, "A New Generation of Gypsum Dispersing Agents," Global Gypsum Conference 2003—Barcelona, Sep. 14-16, 2003, pp. 17.1-17.12.

T. Masuzawa, "Impurities Contained Inside the Crystals of Solar and Vacuum Evaporated Salts," Fifth International Symposium on Salt—Northern Ohio Geological Society, May 29-Jun. 1, 1979, Hamburg, Germany, pp. 463-473.

Seung Joon Kim, Young Geun Lee, Sanghoun Oh, Yun Seok Lee, Young Mi Kim, Moon Gu Jeon, Sangho Lee, In S. Kim, Joon Ha Kim, "Energy saving methodology for the SWRO desalination process: controrl of operating temperature and pressure," Desalination 249 (2009) 260-270.

Peter Eriksson, Markus Kyburz, Wil Pergande, "NF membrane characteristics and evaluation for sea water processing applications," Desalination 184 (2005) 281-294.

EPA Selenium Purification (1991) pp. 1-8.

Ohya et al.; Integrated system for complete usage of components in seawater; Desalination; 134 (2001); p. 29-36.

Chen et al.; Desalination of seawater by thermal distillation and electrodialysis technologies; from Handbook of Environmental Engineering; vol. 13; Membrane and Desalination Technologies (2011) 525-558.

SYSTEM FOR REMOVING MINERALS FROM A BRINE

CROSS REFERENCE TO RELATED APPLICATION

This application is a divisional of U.S. Non-Provisional patent application Ser. No. 14/552,351, entitled "System for Removing Minerals from a Brine," filed Nov. 24, 2014, which claim benefits from the priority of U.S. Provisional Patent Application No. 61/908,318, entitled "System for Removing Minerals from a Brine Using Electrodialysis," filed Nov. 25, 2013. Each of the foregoing is hereby incorporated by reference in its entirety.

BACKGROUND

The subject matter disclosed herein relates generally to mineral extraction and, more particularly, to a system for removing minerals from a brine using electrodialysis.

There are several regions in the United States (e.g., the southwestern United States including New Mexico, Southern California, and parts of Texas) and throughout the world that experience shortages in potable water supplies due, in part, to the arid climate of these geographic locales. As water supplies are limited, the need for innovative technologies and alternative water supplies for both drinking water and agriculture is important. One method for obtaining an alternative source of potable water uses desalination systems to produce the potable water.

The desalination process involves the removal of salts from seawater, agricultural run-off water, and/or brackish ground water brines to produce potable water. Desalination may use an assortment of filtration methods, such as nanofiltration and reverse osmosis, to separate the raw stream into a desalinated water stream and a tailing stream. The tailing streams may contain various salts and other materials left over after the desalination process. Indeed, disposal of the tailing streams produced by desalination may result in soil degradation and ground water contamination. Thus, alternative and innovative uses of the tailing streams may reduce undesirable results of disposing the tailing streams.

One such alternative use involves processing the tailing stream to remove valuable minerals. In particular, inland brackish water and seawater may be rich in sulfates, magnesium, calcium, and other minerals. Sulfates, mainly in the form of gypsum, have a variety of commercial uses, including, but not limited to building materials (e.g., drywall or sheetrock), skin creams, shampoos, and dental impression plasters. In addition, gypsum may be used as a fertilizer and/or soil conditioner in the farming industry. Magnesium may also be extracted in the form of magnesia (e.g., magnesium oxide) which is used in the refractory industry due to its fireproofing capabilities as well as in the medical field as an ingredient in laxatives. As the traditional deposits for these minerals are depleted, the capacity to extract them from alternative sources represents both a valuable commercial opportunity as well as a means for lessening the environmental impact caused by the disposal of waste streams high in salt content.

Existing procedures for the removal of minerals often exhibits sub-optimal efficiency. For example, evaporation pools require a large area of land and often produce low purity mixed salts with minimal commercial value. In addition, a waste mixed salt solid resulting from the evaporation process may leach into the ground water supply. Other methods of extraction involve processing the tailing stream produced in brackish water or seawater desalination plants. However, current mineral extraction procedures for the tailing stream may not operate efficiently.

As described above, desalination systems may employ one for a combination of nanofiltration and reverse osmosis to facilitate the desalination and removal process. Following an initial separation of a potable water stream from a tailing stream, the tailing stream may be processed further by a mineral removal system. For example, various precipitation techniques may be performed that facilitate removal of dissolved minerals from a solution. However, the high salt concentration in the tailing stream may increase the solubility of many of these valuable minerals and, as a consequence, decrease the efficiency in which these minerals may be precipitated. Inadequate removal of these minerals may have a negative impact on the mineral removal system itself. For example, incomplete gypsum removal may result in scaling of filtration and/or reverse osmosis membranes, thereby reducing the life and permeate flux of these membranes. Frequent replacement and repair of such mineral removal system components, in addition to the sub-optimal extraction efficiency, may result in elevated cost of mineral removal prompting the need for further optimization of the mineral removal system.

Furthermore, existing procedures may be inadequate to remove impurities from minerals. The ineffective removal of such impurities, including arsenic, boric acid, and silica, may result in undesirable impurities in removed minerals and decreased productivity of the mineral removal plant due to membrane scaling. Thus, an improved mineral removal system may facilitate higher purity of valuable minerals, decrease impurities, increase efficiency, and increase the life-span of components of the mineral removal system.

BRIEF DESCRIPTION

In one embodiment, a system includes an ion exchange softener fluidly coupled to a wastewater treatment system. The first ion exchange softener may receive a first brine stream from the wastewater treatment system and to remove a plurality of minerals from the first brine stream to generate a second brine stream including the plurality of minerals and a third brine stream. The system also includes a mineral removal system disposed downstream from the ion exchange softener and that may receive the second brine stream and to generate a sodium chloride (NaCl) brine stream and an acid and caustic production system disposed downstream from and fluidly coupled to the mineral removal system. The acid and caustic production system includes a first electrodialysis (ED) system that may receive the NaCl brine stream from the mineral removal system and to generate hydrochloric acid (HCl) and sodium hydroxide (NaOH) from the NaCl brine stream. The system also includes a second ED system disposed downstream from the ion exchange softener and upstream of the acid and caustic production system. The second ED system is fluidly coupled to the ion exchange softener and to the acid and caustic production system, and the second ED may generate desalinated water from the third brine stream and an ED concentrate stream. The second ED system may direct the ED concentrate stream to the acid and caustic production system.

In a second embodiment, a method includes directing a wastewater brine stream from a water treatment system to a first ion exchange softener disposed upstream of a mineral removal system. The wastewater brine stream includes a plurality of minerals. The method also includes generating a first softened brine stream and a first chloride brine stream from the wastewater brine stream via the first ion exchange softener. The first chloride brine stream includes a first portion of the plurality of minerals and the first softened brine stream includes a second portion of the plurality of minerals. The method also includes supplying the first chloride brine stream to the mineral removal system to recover the first portion of the plurality of minerals, supplying the first softened brine stream to a first electrodialysis (ED) system that may generate a second softened brine stream, and generating hydrochloric acid (HCl) and sodium hydroxide (NaOH) from the second softened brine stream via an acid and caustic production system downstream from and fluidly coupled to the first ED system.

In a third embodiment, a method includes removing a plurality of minerals from a first brine stream via an ion exchange softener disposed upstream of a mineral removal system. The first brine stream is output from a waste treatment system, the ion exchange softener includes a resin, and the resin includes an acid portion and a neutral portion. The method also includes reacting bicarbonate in the first brine stream with the acid portion of the resin within the ion exchange softener to generate carbon dioxide, and generating a softened brine stream and a second brine stream from the first brine stream via the ion exchange softener. The second brine stream includes the plurality of minerals and is directed toward the mineral removal system, and the softened brine stream includes the carbon dioxide and is directed toward an electrodialysis (ED) system that may generate desalinated water.

DRAWINGS

These and other features, aspects, and advantages of the present invention will become better understood when the following detailed description is read with reference to the accompanying drawings in which like characters represent like parts throughout the drawings, wherein.

Figure 1:
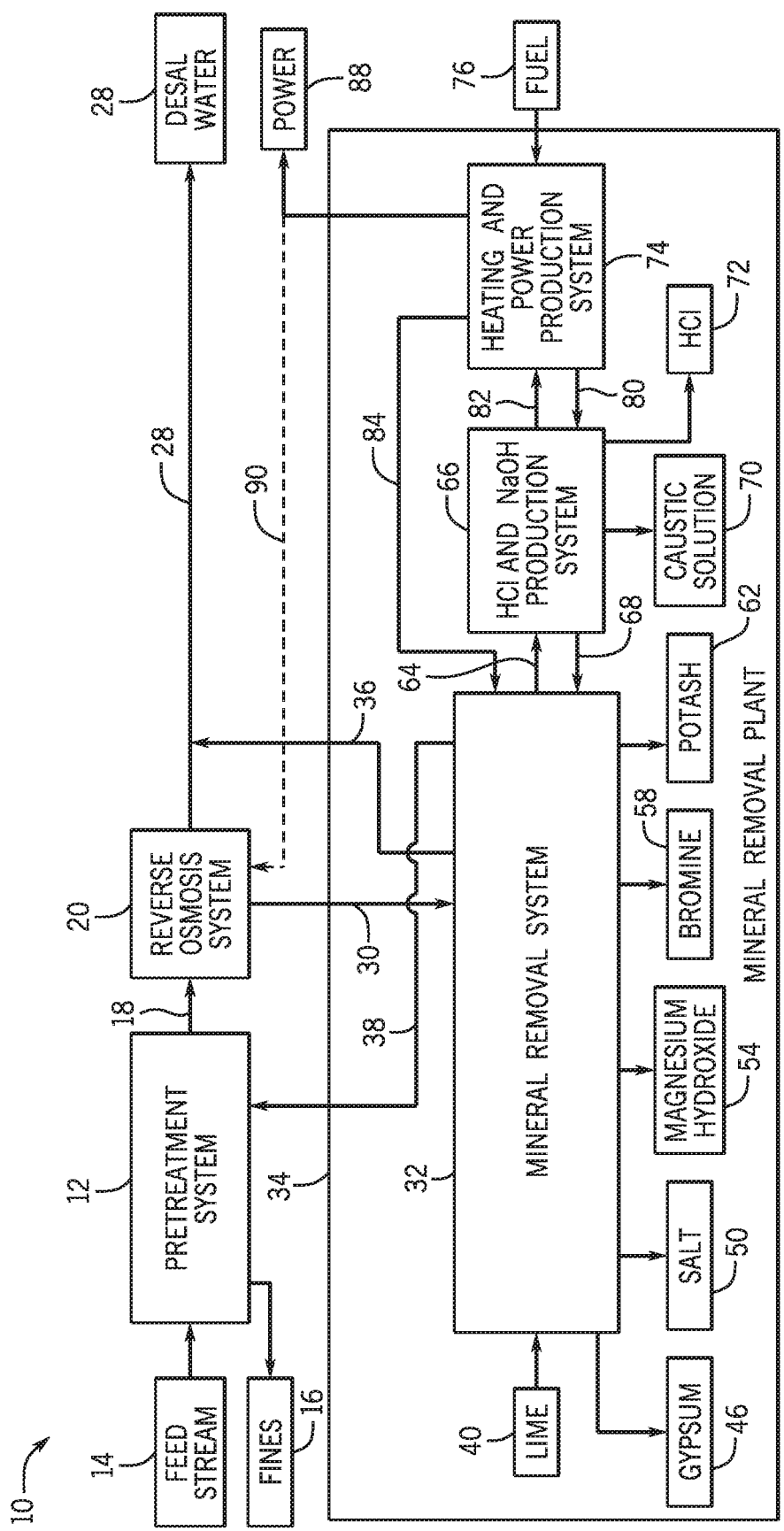
FIG. 1 is a block diagram of an embodiment of a water processing system, wherein the water processing system includes a water removal plant having a mineral removal system and a hydrochloric acid (HCl) and sodium hydroxide (NaOH) production system, in accordance with aspects of the present disclosure.
Figure 2:
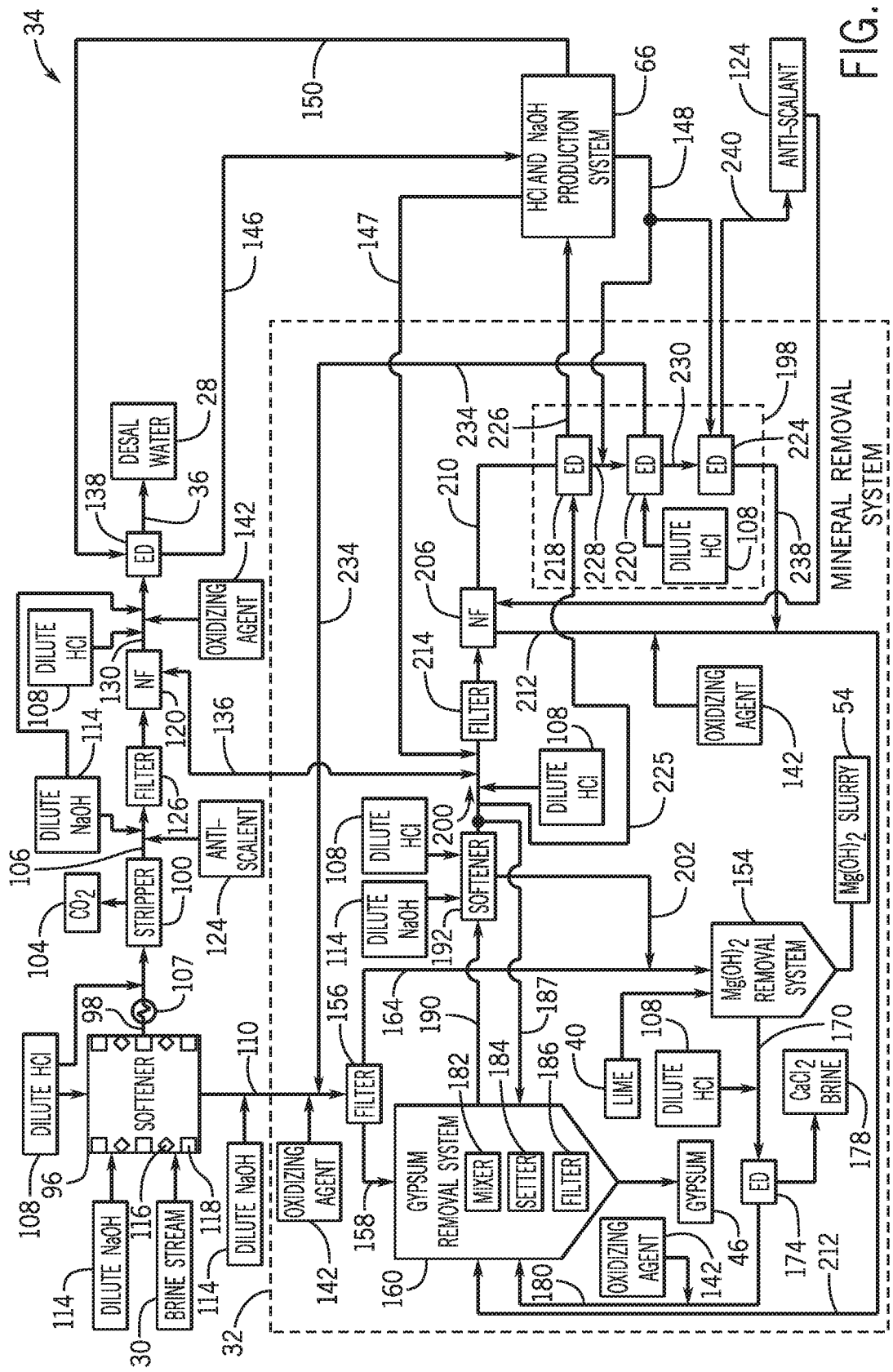
FIG. 2 is a block diagram of an embodiment of the mineral removal plant of FIG. 1, wherein the mineral removal plant includes an ion exchange softener upstream of the mineral removal system, in accordance with aspects of the present disclosure.
Figure 3:
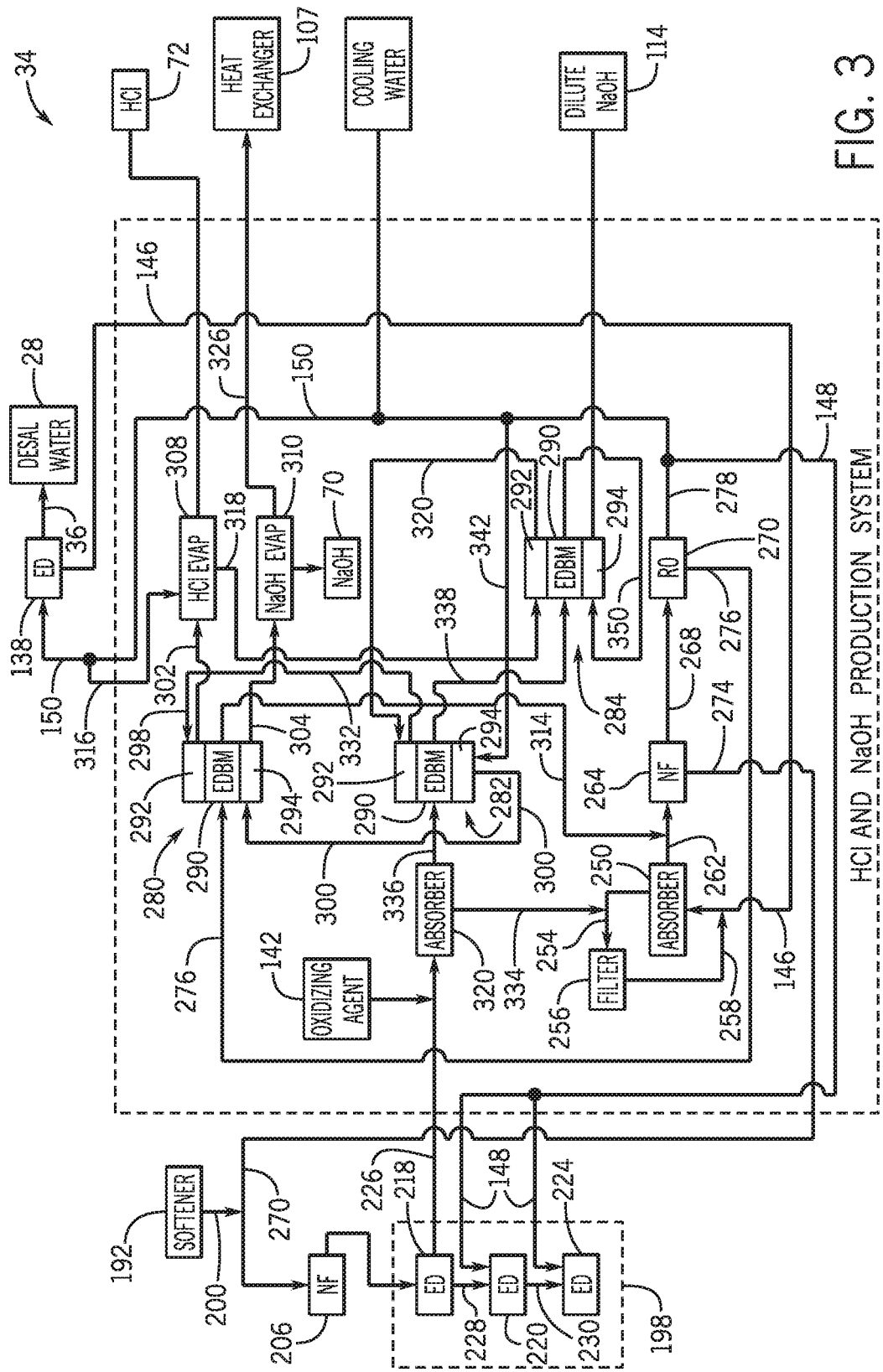
Figure 4:
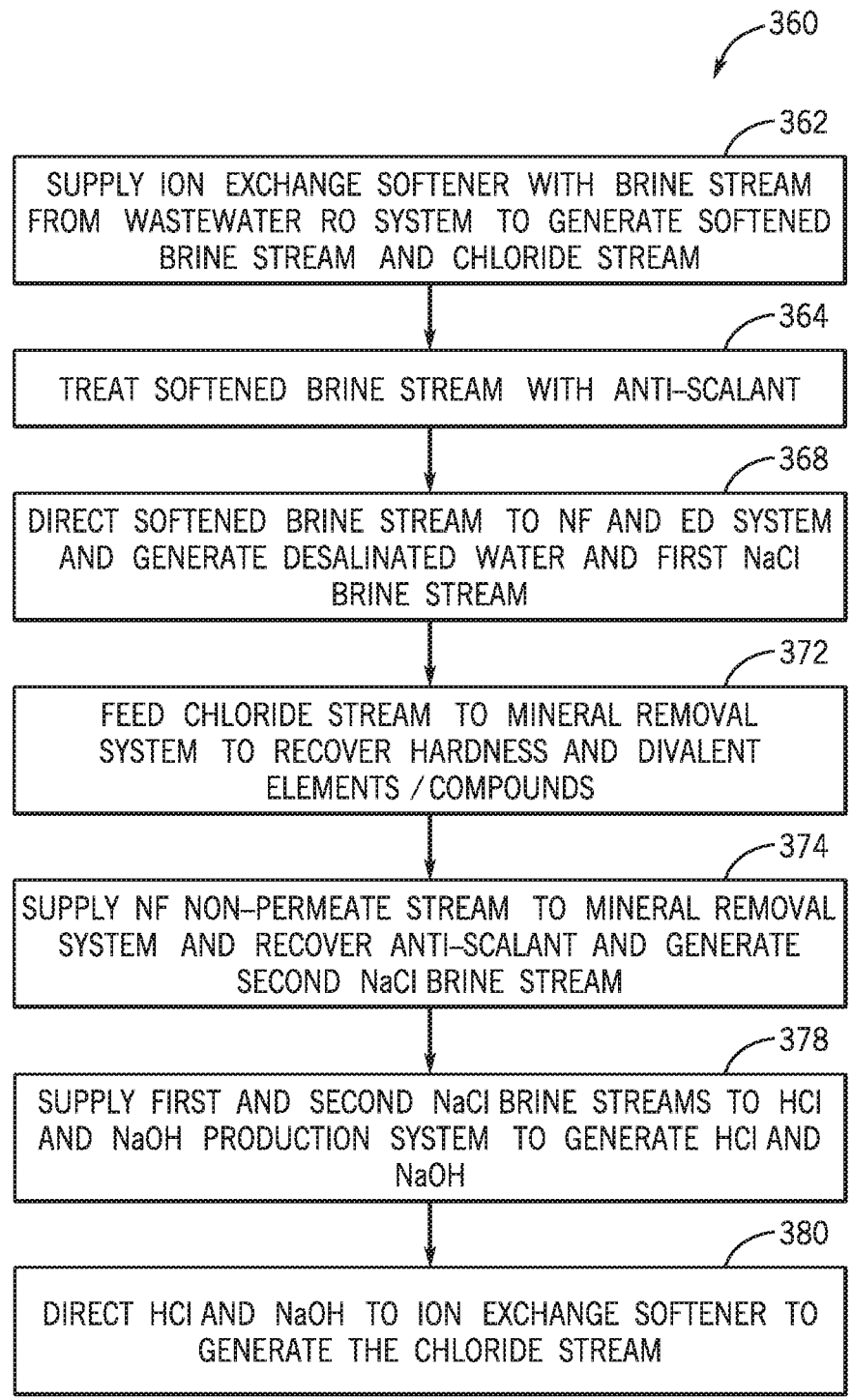

FIG. 3 is a block diagram of another embodiment of the mineral removal plant of FIG. 2, illustrating the HCl and NaOH production system, in accordance with aspects of the present disclosure; and FIG. 4 is a flow diagram of an embodiment of a method for mineral removal and production of HCl and NaOH using the water processing system of FIGS. 1-3, in accordance with aspects of the present disclosure.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments include a water processing system (e.g., desalination system) configured to soften high salinity brine generated during desalination of water (e.g., seawater, agricultural run-off water, and/or brackish ground water). In water desalination processes, ion separation systems are used to extract minerals (e.g., calcium, magnesium, sodium, and sulfate) from tailing streams (e.g., nanofiltration (NF), electrodialysis (ED), and/or reverse osmosis (RO) non-permeate streams) that may otherwise be discarded. The extracted minerals may be recovered as industrial grade products for commercial use. The ion separation systems may include one or more electrodialysis bipolar membranes (EDBM) that use ion-selective membranes to desalinate the water. Ion-selective membranes may be costly, thereby increasing the overall cost of water desalination and mineral removal. Therefore, it may be desirable to reduce a hardness of the water upstream of the electrodialysis membranes such that less expensive non-ion selective membranes may be used. As such, the overall cost of desalination and mineral removal may be decreased.

FIG. 1 is a block diagram of an embodiment of a water processing system 10 that may use non-selective membranes for desalination of water and mineral removal. For example, the water processing system 10 may be part of a water desalination system, wastewater treatment system, water purification system, oil and gas brine treating system or any other suitable water processing system. In the illustrated embodiment, the water processing system 10 is used to produce desalinated water from a feed stream and to remove minerals from the feed stream. For example, the water processing system 10 may be used to produce high purity agricultural grade gypsum ($CaSO_4 \cdot 2H_2O$) (e.g., approximately greater than 97 weight percent (wt %) gypsum on a dry basis), industrial grade caustic (e.g., approximately greater than 97 wt % sodium hydroxide (NaOH) on a dry basis), industrial grade magnesium hydroxide ($Mg(OH)_2$) (e.g., approximately greater than 98 wt % $Mg(OH)_2$ on an ignited basis, or on an ignited oxide basis) suitable for industrial magnesia refractory, industrial grade sodium chloride (NaCl) (e.g., approximately greater than 99.9 wt % NaCl on a dry basis), concentrated HCl for commercial use (e.g., approximately 10 wt % to approximately 35 wt % HCl), and/or desalinated water (e.g., approximately less than 1.0 grams/Liter (g/L) (1000 parts per million (ppm)) total dissolved solids (TDS)) from underground brines, seawater desalination waste brines, and/or brackish water desalination waste brines. Furthermore, the water processing system 10 may use a combination of one or more of gypsum precipitation, magnesium hydroxide precipitation, electrodialysis (ED), and/or softening and nanofiltration (NF) to remove the minerals from brines as industrial grade products and/or to substantially reduce (or eliminate) a waste brine stream.

In the illustrated embodiment, the water processing system 10 includes a pretreatment system 12 configured to receive a feed stream 14. The feed stream 14 may be received from any suitable water source. For example, the feed stream 14 may be received from ground water, seawater, brackish water, and so forth. Moreover, the feed stream 14 may contain various elements and/or compounds. For example, the feed stream 14 may contain NaCl, sulfate ($SO_4$), calcium (Ca), magnesium (Mg), and/or silicon dioxide (silica or $SiO_2$). In certain embodiments, the feed stream 14 may contain approximately 0.50 g/L (500 ppm) to approximately 3.00 g/L (3,000 ppm) NaCl, approximately 0.10 g/L (100 ppm) to approximately 1.50 g/L (1,500 ppm) $SO_4$, approximately 0.01 g/L (10 ppm) to approximately 0.80 g/L (80 ppm) Ca and Mg, and/or approximately 0.01 g/L (10 ppm) to approximately 0.30 g/L (30 ppm) $SiO_2$. Furthermore, in certain embodiments, the feed stream 14 may have a pH range between approximately 5 and approximately 9. For example, the feed stream 14 may have a pH of approximately 8.

In certain embodiments, the pretreatment system 12 receives the feed stream 14 and removes solid materials (e.g., fines 16), such as iron (Fe) and manganese (Mn), from the feed stream 14. In other embodiments, the iron and manganese may be removed downstream from the pretreatment system 12 (e.g., in a mineral removal system), as discussed in detail below. The pretreatment system 12 provides a pretreated feed stream 18 to a first reverse osmosis (RO) system 20. The first RO system 20 receives the pretreated feed stream 18 and produces a desalinated water stream 28. In certain embodiments, the desalinated water stream 28 may include $SiO_2$. Moreover, the desalinated water stream 28 may have a pH of approximately 7.5. Furthermore, the first RO system 20 provides a brine stream 30 to a mineral removal system 32. In certain embodiments, the desalinated water stream 28 may be approximately 70 percent to approximately 90 percent of the output from the first RO system 20, and the brine stream 30 may be approximately 10 percent to approximately 30 percent of the output from the first RO system 20. For example, in some embodiments, the desalinated water stream 28 may be approximately 80 percent of the output from the first RO system 20, and the brine stream 30 may be approximately 20 percent of the output from the first RO system 20. As may be appreciated, while the illustrated embodiment uses the first RO system 20, other embodiments may use an NF system in place of an RO system.

The mineral removal system 32 may be part of a mineral removal plant 34. The mineral removal plant 34 is configured to remove minerals, elements, and/or compounds from the brine stream 30. As may be appreciated, the brine stream 30 may be provided to the mineral removal plant 34 from any suitable source and/or system. In certain embodiments, the brine stream 30 may include substantial amounts of salts, such as NaCl, sodium sulfate ($Na_2SO_4$), calcium (Ca), and/or magnesium (Mg). As discussed above, softening the brine stream 30 (e.g., reduce an amount of the salts in the brine stream 30) may mitigate scaling (precipitation) of the salts. Accordingly, the system 10 may soften the brine stream 30 mechanically (e.g., with an ion exchange system), as discussed in further detail below. The mineral removal system 32 may provide one or more desalination streams 36 that include desalinated water (which may contain $SiO_2$). Furthermore, the one or more desalination streams 36 may include a disinfectant and/or oxidant. The disinfectant and/or oxidant may be provided to the pretreatment system 12 via a disinfectant stream 38.

A lime based material 40 (e.g., lime, quick lime, dolomitic lime, etc.) may be provided to the mineral removal system 32 to facilitate mineral removal from the brine stream 30. During operation, the mineral removal system 32 may be configured to remove any suitable minerals, elements, and/or compounds from the brine stream 30. For example, the mineral removal system 32 may provide a gypsum stream 46 (e.g., agricultural grade gypsum), a salt stream 50 (e.g., industrial grade sodium chloride), a magnesium hydroxide stream 54 (e.g., industrial grade magnesium hydroxide), a bromine stream 58, a potash stream 62, and/or other mineral streams depending on the mineral content of the brine stream 30.

The mineral removal system 32 may generate additional streams that may be collected for commercial use and/or utilized in a downstream process of the water processing system 10. In certain embodiments, the mineral removal system 32 may provide one or more output streams 64 to an HCl and NaOH production system 66. For example, the mineral removal system 32 may provide a NaCl brine to the HCl and NaOH production system 66. The HCl and NaOH production system 66 may generate concentrated HCl via an ion separation process (e.g., ED process) followed by an evaporation process. Furthermore, the mineral removal system 32 may receive one or more input streams 68 from the HCl and NaOH production system 66. The one or more input streams 68 may provide the mineral removal system 32 with HCl and/or caustic (e.g., NaOH) produced by the HCl and NaOH production system 66. In addition, the HCl and NaOH production system 66 may generate a caustic solution 70 (e.g., NaOH) and/or a concentrated HCl product solution 72 that is not used by the mineral removal system 32 (e.g., produced to be sold).

The mineral removal plant 34 also includes a heating and power production system 74. The heating and power production system 74 may include a natural gas engine and/or a boiler. The heating and power production system 74 may be configured to receive a fuel 76. The fuel 76 may be any suitable fuel, such as natural gas, synthetic natural gas (e.g., syngas), or combination thereof. The heating and power production system 74 may provide power, steam, hot water, any suitable heated fluid, and so forth to the HCl and NaOH production system 66, as indicated by arrow 80. Moreover, the heating and power production system 74 may receive a cooled fluid stream 82 (e.g., cooled water) from the HCl and NaOH production system 66. As illustrated, the heating and power production system 74 may also provide power to the mineral removal system 32, as indicated by arrow 84. Additionally, the heating and power production system 74 may provide power 88 to another system and/or the first RO system 20, as indicated by arrow 90.

FIG. 2 is a block diagram of an embodiment of the mineral removal plant 32 that may be used with the system 10 to reduce the salinity of the brine stream 30. As previously described, the mineral removal system 32 receives the brine stream 30 from the first RO system 20. As may be appreciated, the brine stream 30 may contain various hardness elements and/or compounds. For example, the brine stream 30 may contain various salts and minerals such as, but not limited to, NaCl, $SO_4$, Ca, Mg, and/or $SiO_2$. In certain embodiments, the brine stream 30 may contain approximately 3.0 g/L (3,000 ppm) to approximately 8.0 g/L (8,000 ppm) NaCl, approximately 3.0 g/L (3,000 ppm) to approximately 8.0 g/L (8,000 ppm) $SO_4$, approximately 0.1 g/L (100 ppm) to approximately 0.4 g/L (400 ppm) Mg, approximately 0.2 g/L (200 ppm) to approximately 0.6 g/L (600 ppm) Ca, and/or approximately 0.05 g/L (50 ppm) to approximately 0.02 g/L (200 ppm) $SiO_2$. Furthermore, in certain embodiments, the brine stream 30 may have a pH range between approximately 4 and approximately 8. For example, the brine stream 30 may have a pH of approximately 6.

In the illustrated embodiment, the brine stream 30 flows through a first ion exchange softener 96 (e.g., such as an Amberlite™ IRC747 manufactured by The Dow Chemical Company of Midland, Mich.) where a substantial portion (e.g., approximately greater than 99%) of hardness minerals are removed. For example, the first ion exchange softener 96 removes divalent cations (e.g., $Ca^{2+}$, $Mg^{2+}$, $Fe^{2+}$, $Mn^{2+}$, $Sr^{2+}$, and $Ba^{2+}$) from the brine stream 30, thereby reducing a hardness of the brine stream 30. In operation, a resin within the first ion exchange softener 96 absorbs the divalent ions from the brine stream 30 to generate a first softener effluent stream 98. The first softener effluent stream 98 may have approximately less than 0.015 g/L (15 ppm) of Ca, Mg, Sr, and Ba. Iron (Fe) and manganese (Mn) in the brine stream 30 are kept in a reduced divalent state such that they may be removed as dissolved species without scaling of the softener resin. The brine stream 30 may also contain bicarbonate ($HCO_3$). As discussed below, the first ion exchange softener 96 may convert the bicarbonate to carbon dioxide ($CO_2$). The carbon dioxide may be removed in an air stripper 100 downstream from the first ion exchange softener 96 as $CO_2$ gas 104, generating a degassed softened brine stream 106. In certain embodiments, multiple stages are used in the air stripper 100 to enable a low $CO_2$ residual (e.g., less than approximately 0.002 g/L (2 ppm) $CO_2$). A low $CO_2$ residual may inhibit carbonate reformation and scaling when a pH of the first softener effluent stream 98 increases during the various downstream brine treatment steps. The degassed softened brine stream 106 is desalinated to generate the desalinated water 28, as discussed in detail below.

Prior to degassing, the first softener effluent 98 may be heated with a heat exchanger 107 to between approximately 32° C. (90° F.) and approximately 50° C. (122° F.). The heat exchanger 107 may use vacuum vapors from a caustic evaporator within the HCl and NaOH production system 66 to heat the first softener effluent stream 98. In certain embodiments, the first softener effluent stream 98 may be mixed with HCl 108 (e.g., between approximately 6 wt % and approximately 8 wt % HCl) upstream of the air stripper 100 and downstream from the heat exchanger 107. The HCl 108 may decrease a pH of the first softener effluent stream 98 to less than approximately 4, thereby converting any residual $HCO_3$ to $CO_2$. As should be noted, the HCl 108 may be generated by the HCl and NaOH production system 66.

During softening of the brine stream 30, the first ion exchange softener 96 may become saturated with the divalent ions (e.g., Ca and Mg). Accordingly, the first ion exchange softener 96 may be treated with the HCl 108 to remove the absorbed divalent ions from the softener resin, thereby regenerating the softener resin. Treatment of the first ion exchange softener 96 with the HCl 108 generates a first concentrated brine stream 110, which includes the hardness and divalent ions (e.g., $Ca^{2+}$, $Mg^{2+}$, $Fe^{2+}$, $Mn^{2+}$, $Sr^{2+}$, $Ba^{2+}$, and $SO_4^{2-}$) and NaCl. The first concentrated brine stream 110 is fed to the mineral removal system 32 for mineral removal and recovery, as discussed in detail below. In addition to adding the HCl 108, the first ion exchange softener 96 may be treated with NaOH 114 (e.g., between approximately 0.1 wt % and approximately 4 wt %). The NaOH 114 may neutralize at least a portion of the first ion exchange softener 96 after regeneration (e.g., removal of hardness divalent species) of the softener resin with the HCl 108. For example, the NaOH 114 converts a portion of the softener resin from an acid form ($H^+$) 116 to a sodium form ($Na^+$) 118, thereby neutralizing the portion of the softener resin. Therefore, in certain embodiments, the softener resin may be in both the acid and sodium forms 116, 118, respectively. The sodium form 118 of the softener resin may remove the hardness and divalent ion species from the brine stream 30 via ion exchange, while the acid form 116 may convert the bicarbonate in the brine stream 30 to the $CO_2$ 104. As such, additional HCl 108 may not need to be added downstream of the first ion exchange softener 96 for removal of the bicarbonate.

A concentration of the NaOH 114 may be adjusted based, at least in part, on an amount of bicarbonate in the brine stream 30. For example, if the concentration of the bicarbonate in the brine stream 30 is high (e.g., greater than approximately 200 mg/L (200 ppm)), the concentration of the NaOH 114 may be decreased such that less of the softener resin is neutralized. That is, by adding less concentrated NaOH 114 to the first ion exchange softener 96, less of the acid form 116 of the resin may be neutralized to the sodium form 118. Therefore, more acid may be available in the softener resin to convert the bicarbonate to $CO_2$ in brine streams having a high concentration of bicarbonate. In contrast, if the bicarbonate concentration is low (e.g., less than approximately 50 mg/L (50 ppm)), a higher concentration of NaOH 114 may be used to neutralize a larger portion of the softener resin. Effluent generated from the neutralization of the first ion exchange softener 96 is essentially desalinated water. For example, the sodium ions in the NaOH 114 are absorbed by the softener resin and the hydroxide ions ($OH^-$) in the NaOH 114 react with the acid ($H^+$) in the softener resin to generate desalinated water effluent (e.g., the one or more desalinated water streams 36). The desalinated water effluent may be combined with the desalinated water stream 28.

As discussed above, the degassed softened brine stream 106 is desalinated to produce at least a portion of the desalinated water 28. While the hardness and divalent scale forming compounds/elements are removed, the degassed softened brine stream 106 may still contain impurities and other scale forming compounds such as silica ($SiO_2$) and sodium sulfate ($Na_2SO_4$). Accordingly, the degassed softened brine stream 106 is routed to a first nanofiltration (NF) unit 120 that removes one or more of the other scale producing species (e.g., $SO_4$) from the degassed softened brine stream 106. The degassed softened brine stream 106 may be mixed with an anti-scalant 124 upstream of the first NF unit 120. The anti-scalant 124 may mitigate precipitation of silica in the degassed softened brine stream 106. Non limiting examples of the anti-scalant include phosphonates such as 1-hydroxyethylidene 1,1-diphosphonic acid (HEDP) or other proprietary silica anti-scalants such as Vitec 4000 (Avista Technologies Inc) Genesys SI (Genesys International Ltd). Additionally, in certain embodiments NaOH 114 may be added to the degassed softened brine stream 106. The NaOH 114 may adjust a pH of the degassed softened brine stream 106 to above approximately 4. For example, the NaOH 114 may increase the pH of the degassed softened brine 106 to between approximately 4 and approximately 7. The pH increase may cause precipitation of certain compounds within the degassed softened brine 106. Therefore, the degassed softened brine 106 may be filtered before feeding to the first NF unit 120. For example, the degassed softened brine 106 may be filtered through a first filter 126. The first filter 126 may remove the precipitated solids (e.g., iron hydroxide) formed during pH adjustment of the degassed softened brine 106. In certain embodiments, the first filter 126 may be a 2-8 micron filter cartridge. However, any other suitable filter size may be used to remove the solids.

The first NF unit 120 may include 2 to 4 stages of reverse osmosis and nanofiltration membranes that remove the sulfate from the degassed softened brine stream 106. Accordingly, the first NF unit 120 may generate a first NF permeate stream 130 having less than approximately 20% sulfate. A first NF non-permeate stream 136 may be routed to the mineral removal system 32, as discussed in detail below. The first NF permeate stream 130 may include approximately 80% or more of silica and chloride, and residual sulfate. Therefore, the first NF permeate stream 130 is routed to a first electrodialysis (ED) system 138 for removal of the chlorides and residual sulfate, thereby generating the desalinated water 28. The desalinated water 28 includes most of the silica (e.g., greater than approximately 80%) from the brine stream 30.

In addition to having chlorides and residual sulfate, the first NF permeate stream 130 may also include arsenic (As). For example, the brine stream 30 may have dissolved arsenic from brackish groundwater treatment upstream of the mineral removal system 32. The first NF unit 120 does not remove the dissolved arsenic. Therefore, to meet drinking water standards, the first NF permeate stream 130 may be treated with an oxidizing agent 142, e.g., sodium hypochlorite or other suitable oxidant. In certain embodiments, the oxidizing agent 142 may be added to the degassed softened brine stream 106 upstream from the first NF system 120. The oxidizing agent 142 oxidizes the arsenic and generates arsenate ($AsO_4H_3$). Depending on the pH of the first NF permeate stream 130, the pH may be adjusted with either HCl 108 or NaOH 114 such that the first NF permeate stream 130 has a pH of approximately 5. At pH 5, arsenate is in ionic form (e.g., $H_2AsO_4^-$). Therefore, arsenate, in the ionic form, may be removed by the first ED system 138. An ED concentrate stream 146 may be routed to the HCl and NaOH production system 66 where it is separated into an HCl product stream 108, an NaOH product stream 114, a purge sodium sulfate and sodium chloride brine stream 147 and desalinated water streams 148 and 150. Stream 150 may be used to dilute the ED concentrate stream 146, thereby decreasing a concentration of NaCl and $SO_4$ in the ED concentrate stream 146. By removing the hardness and divalent compounds/elements in the brine stream 30 before the stream 30 is fed to the NF and ED systems, the ED system 138 may utilize non-selective membranes to generate the desalinated water streams 36. The non-selective membranes generally have a lower cost compared to ion selective membranes (e.g., monovalent selective membranes). Therefore, the overall operational and maintenance costs of the system 10 may be decreased, as compared to system that employ ion selective membranes throughout the system and do not have a softener (e.g., the first ion exchange softener 96).

As discussed above, the mineral removal system 32 receives the first concentrated brine stream 110, the first NF non-permeate stream 136, the purge sodium sulfate and sodium chloride stream 147, and the desalinated water stream 148. The mineral removal system 32 removes minerals (e.g., hardness and divalent compounds/elements, chlorine salts, and sulfate) from the respective streams 110, 136, and 146, thereby generating the gypsum 46, magnesium 54, and other compounds (e.g., salt 50, bromine 58, and potash 62). For example, in the illustrated embodiment, stream 110 is directed to a magnesium hydroxide removal system 154. During operation, the magnesium hydroxide removal system 154 is configured to recover Mg from the brine stream 30 in the form of magnesium hydroxide 54. The stream 110 may be treated with caustic (e.g., the NaOH 114) and the oxidizing agent 142 upstream of the magnesium hydroxide removal system 154. The oxidizing agent 142 oxidizes the iron species $Fe^{2+}$ to $Fe^{3+}$. The NaOH 114 adjusts a pH of the stream 110 to between approximately 5 and approximately 7, which enables formation and precipitation of ferric hydroxide ($Fe(OH)_3$). The ferric hydroxide may be removed by filtering the stream 110 through a second filter 156.

In certain embodiments, the filtered stream 110 may be treated with additional caustic to increase the pH to between approximately 8 and approximately 10, thereby precipitating manganese and generating industrial grade manganese. In other embodiments, both the manganese and iron may be precipitated in a single step by adjusting the pH of the stream 110 to between approximately 8 and approximately 10 before filtering in the second filter 156. Rather than in a two step process, e.g., first adjusting the pH to between approximately 5 and approximately 7 to precipitate the ferric hydroxide before filtering the stream 110 in the second filter 156, followed by adjusting the pH to between approximately 8 and approximately 10 after filtering the stream 110 in the second filter 156 to precipitate manganese.

The second filter 156 may be regenerated periodically by adding HCl 108 (e.g., between approximately 5 wt % and approximately 20 wt % HCl). The HCl 108 dissolves the iron and manganese, thereby regenerating the second filter 156. Acidified filter effluent 158 containing the dissolved iron, and, in certain embodiments, manganese, may be fed to a gypsum removal system 160. The acidified filter effluent 158 may be used as a coagulant in the gypsum removal system 160 or may be concentrated and sold as a commercial coagulant. A filtered brine stream 164 is routed to the magnesium hydroxide removal system 154. While in the magnesium hydroxide removal system 154, the filtered brine stream 164 is treated with the lime 40 or between approximately 7 wt % and 12 wt % caustic (e.g., NaOH 114) from the HCl and NaOH production system 66. For example, the filtered brine stream 164 may be treated with lime 40 when a $Ca/SO_4$ molar ratio in the filtered brine stream 164 is less than approximately 1. That is, when a concentration of $SO_4$ in the filtered brine stream 164 is more than a concentration of Ca. In contrast, when the $Ca/SO_4$ molar ratio in the filtered brine stream 164 is greater than approximately 1, the filtered brine stream 164 may be treated with NaOH 114. The lime 40 and NaOH 114 enable precipitation of $Mg(OH)_2$, thereby recovering the $Mg(OH)_2$ 54 (between approximately 50 wt % to approximately 70 wt % $Mg(OH)_2$) and from the brine stream 30. The $Mg(OH)_2$ 54 recovered may be sold an industrial grade product.

Following magnesium recovery in the magnesium hydroxide removal system 154, an effluent brine stream 170 is directed to the gypsum removal system 160. The gypsum removal system 160 recovers the Ca and $SO_4$ from effluent brine stream 170 to generate the gypsum 46. In embodiments in which the $Ca/SO_4$ ratio is greater than 1, the effluent brine stream 170 may be treated with the HCl 108 (between approximately 6 wt % and approximately 8 wt % HCl) to adjust a pH of the effluent brine stream 170 to between approximately 7 and approximately 8. At least a portion of the pH adjusted effluent brine stream 170 is fed to a second ED system 174. The second ED unit 174 may extract a portion of the calcium in the effluent brine stream 170, thereby generating calcium chloride ($CaCl_2$) brine 178 having between approximately 15 wt % and approximately 35 wt % $CaCl_2$. The $CaCl_2$ brine 178 may be made available as a commercial product. An ED diluate stream 180 containing the remaining calcium chloride and sodium sulfate and sodium chloride brine (stream 212 and 238) is fed to the gypsum removal system 160 for removal of Ca and $SO_4$ to generate the gypsum 46.

The gypsum removal system 160 may include a mixer 182, a settler 184, and a third filter 186 that facilitate removal of the gypsum 46 from the brine stream (e.g., the ED diluate stream 180). In certain embodiments, the stream 180 may be treated with the oxidizing agent 142 to convert any residual arsenic to arsenate, as discussed above, upstream of the gypsum removal system 160. The Ca and $SO_4$ in the stream 180 react in the gypsum removal system 160 to precipitate the gypsum 46. In certain embodiments, approximately 50% to approximately 70% of the $SO_4$ is removed from the stream 180. The presence of gypsum 46 seed crystals in the mixer 182 (e.g., a turbulent mixer) operating at a neutral pH (e.g., a pH of approximately 6 to 8) may facilitate gypsum 46 precipitation kinetics, thereby enabling rapid gypsum precipitation. The gypsum 54 particles may form a suspension and, therefore, may be well mixed with the water. Accordingly, while in the mixer 182, the stream 180 may be treated with the acidified filter effluent 158 to coagulate (clump) the gypsum 46 particles, and facilitate separation of the gypsum particles from the water. For example, as discussed above, the acidified filter effluent 158 includes ferric hydroxide, which may be used as a coagulant.

In addition to gypsum 46 precipitation, insoluble calcium fluoride ($CaF_2$) may also precipitate in the mixer 182, thereby removing a substantial portion of the fluoride from the stream 180. As such, fluoride scaling in downstream ED systems may be mitigated. In the settler 184, the gypsum crystals settle, and the saturated near solids free solution is decanted off and filtered by the third filter 186 (e.g., a sand filter, a microfilter, an ultrafilter, cartridge filter and so forth) to remove residual gypsum particles. A small amount of softened salt brine 187 is recycled to the settler overflow to increase gypsum solubility and to desaturate the brine stream, thereby reducing scaling in the third filter 186 and other downstream units. The settler bottoms may be routed to a hydroclone and the third filter 186 to wash (e.g., with desalinated product water) and concentrate the gypsum 46 into a saleable washed filter cake. In certain embodiments, the filter cake may include approximately 70 wt % to approximately 100 wt % gypsum 46. For example, the filter cake may include approximately 90 wt % gypsum 46. Thus, gypsum 46 is provided as an output 188 from the gypsum removal system 160. The fine solids overflow stream from the hydroclone is recycled to the mixer 182 as seed crystals. The filtrate from the third filter 186 is recycled to the settler 184. In certain embodiments, filtrate from the third filter 186 and effluent from the settler 184 are treated with sodium bisulfate ($NaHSO_4$) to remove any residual oxidizing agent 142. For example, the $NaHSO_4$ may react with sodium hypochlorite to produce $SO_4$ and chloride.

The gypsum removal system 160 may remove approximately 60% to approximately 75% of the calcium received from the stream 180 as gypsum 46, and produce a NaCl brine stream 190. The NaCl brine stream 190 also includes the $SO_4$ and chloride generated during treatment of the filtrate from the third filter 186 and the effluent from the settler 184 with $NaHSO_4$. The NaCl brine stream 190 may also include residual magnesium and calcium that were not removed in the removal systems 154, 160. For example, the NaCl brine stream 190 may contain less than approximately 5-9 g/L (5,000-9,000 ppm) gypsum 54 and less than approximately 0.4 g/L (400 ppm) magnesium chloride. Therefore, the brine stream 190 is fed to a second ion exchange softener 192 before routing to an anti-scalant recovery ED system 198 within the mineral removal system 32. Similar to the first ion exchange softener 96, the second ion exchange softener 192 removes the residual magnesium and calcium from the brine stream 190, thereby generating a second softener effluent stream 200. In this way, ion selective electrodialysis membranes generally used in ED systems may be replace with more cost efficient non-selective electrodialysis membranes. The second ion exchange softener 192 is treated with HCl 108 and NaOH 114, and a second concentrated brine stream 202 is produced and combined with the stream 164 downstream from the second filter 156 to facilitate recovery of the calcium and magnesium.

The second softener effluent stream 200 and the purge sodium sulfate and sodium chloride stream 147 from the HCl and NaOH production system 66 is directed to a second NF system 206. The second NF system 206 enables removal of sulfate from the second softener effluent stream 200, and generates a second NF permeate stream 210 (e.g., having greater than approximately 40 g/L (40,000 ppm) NaCl) and a second NF non-permeate stream 212. The second NF non-permeate stream 212 may include between approximately 50 g/L (50,000 ppm) and approximately 70 g/L (70,000 ppm) total dissolved solids, which include Ca and $SO_4$. Therefore, the second NF non-permeate stream 212 is directed to the gypsum removal system 160 to recover the Ca and $SO_4$ as the gypsum 46. In certain embodiments, the second softener effluent stream 200 may be combined with the first NF non-permeate stream 136 upstream of the second NF system 206. The streams 136, 200 may be neutralized with HCl 108 (between approximately 5 wt % and approximately 8 wt % HCl) and filtered with a fourth filter 214 (similar to the filters 126, 156) before being fed to the second NF system 206. The fourth filter 214 may substantially block gypsum scale from passing to the second NF system 206. In certain embodiments, a portion of the second softener effluent stream 200 may be recycled to the gypsum settler 184. The recycled brine may desaturate effluent from the settler 184 and reduce gypsum scaling in the gypsum recovery system 160.

In addition to having a high concentration of NaCl, the second softener effluent stream 200 also includes the anti-scalant 124. It may be desirable to recover and recycle the anti-scalant 124 used throughout the system 10. Recovering and recycling the anti-scalant 124 may decrease the overall operational costs of the system 10 by decreasing costs associated with the purchase of the anti-scalant 124. Accordingly a portion of the second softener effluent stream 200, the second NF permeate stream 210, and desalinated water stream 148 is routed to the anti-scalant recovery ED system 198 for recovery of the anti-scalant 124. In the illustrated embodiment, the anti-scalant recovery ED system 198 includes a first stage ED unit 218, a second stage ED unit 220, and a third stage ED unit 224. However, as should be appreciated, the anti-scalant recovery ED system 198 may include more or fewer stages. For example, the anti-scalant recovery ED system 198 may include one, two, three, four, five, or more ED stages. The ED units 218, 220, and 224 may use cation and anion selective membranes or non-selective membranes for removal of residual arsenate, calcium, and magnesium from the second NF permeate stream 210. For example, the second NF permeate stream 210 is fed to a concentrate side of the first stage ED unit 218, and a portion 225 of the softener effluent stream 200 is fed to a diluate side of the first stage ED unit 218. The first stage ED unit 218 extracts sodium chloride (NaCl) and residual arsenate from the portion 225 of the softener effluent stream 200 into the second NF permeate stream 210. The first stage ED unit 218 may operate at a pH of approximately 4 to approximately 7. The higher pH enables ionization of the arsenic to generate arsenate, thereby facilitating removal of arsenic from the second NF permeate stream 210. At the operational pH of the first stage ED unit 218, silica in the second NF permeate stream 210 is non-ionic. Therefore, the first stage ED unit 218 may not remove silica. As such, a first stage ED concentrate stream 226 may include approximately less than 0.01 g/L (100 ppm) silica.

A first stage ED diluate stream 228 having the anti-scalant 124 is fed to the second stage ED unit 220. The first stage ED concentrate stream 226 is directed to the HCl and NaOH production system 66 and used for production of HCl and NaOH (e.g., the HCl 72, 108 and NaOH 114), as discussed in detail below with reference to FIG. 3. In certain embodiments, a pH of the first stage ED diluate stream 228 may be adjusted by adding HCl 108 (between approximately 6 wt % and approximately 8 wt % HCl). For example, the pH of the first stage ED diluate stream 228 may be decreased to less than approximately 3. In this way, ferric chloride (Fe(III)Cl$_2$) added upstream of the second softener 192 may be released from the anti-scalant 124, and the anti-scalant 124 may be recovered in the third stage ED unit 224.

The first stage ED diluate stream 228 includes chloride salts such as, but not limited to, calcium chloride, magnesium chloride, iron chloride, and others. The second stage ED unit 220 (e.g., mixed chloride extraction ED) extracts a substantial portion (e.g., approximately 65% to 80%) of the magnesium chloride, calcium chloride, and sodium chloride from the first stage ED diluate stream 228 using anionic monovalent permselective membranes to produce a second stage ED dilute stream 230 and a second stage ED concentrate stream 234. The stream 234 is concentrated with magnesium chloride, calcium chloride, and sodium chloride brine (e.g., approximately 3 wt % to approximately 25 wt %). The second stage ED concentrate stream 234 may be combined with the first concentrated brine stream 110 and recycled back through the removal systems 154, 160. Because the second stage ED diluate stream 230 may have an increased concentration of calcium and magnesium, makeup water from the HCl and NaOH production system 66 may be fed to the second stage ED unit 220, as indicated by arrow 148, to dilute the first stage ED concentrate stream 226 and mitigate scaling in the systems 154, 160.

The third stage ED unit 224 receives the second stage ED diluate stream 230 and uses non-selective membranes to remove residual Na$_2$SO$_4$ from the second stage ED diluate stream 230 and recover the anti-scalant 124. Similar to the second stage ED unit 220, the third stage ED unit 224 may also receive makeup water 148 from the HCl and NaOH production system 66 to dilute sodium sulfate brine 238 output from the third stage ED unit 224. The third stage ED unit 224 directs the sodium sulfate brine 238 to the gypsum removal system 160. The third ED unit 224 also generates a regenerated anti-scalant stream 240. The regenerated anti-scalant stream 240 may be directed to various streams and/or components of the system 10 such that the anti-scalant 124 may be re-used by the system 10 (e.g., in the NF systems 126, 206). In certain embodiments, the regenerated anti-scalant 124 may be provided as an industrial grade commercial product.

FIG. 3 is an embodiment of the HCl and NaOH production system 66 that may be used by the mineral removal plant 34 to generate HCl and NaOH (e.g., the HCl 72, 108 and NaOH 114). As discussed above, the HCl and NaOH production system 66 receives the streams 146, 226 from the ED systems 138, 198. The HCl and NaOH production system 66 includes a first absorber 250 that receives the ED concentrate stream 146. As discussed above, the ED concentrate stream 146 includes arsenic. The first absorber 250 may remove arsenic from the ED concentrate stream 146. Prior to feeding the ED concentrate stream 146 to the first absorber 250, the stream 146 may be treated with sodium bisulfate (NaHSO$_3$). The sodium bisulfate reacts with residual oxidizing agent 142 used to oxidize arsenic upstream of the first NF system 120. For example, the reaction of sodium bisulfate and the residual oxidizing agent 142 (e.g., sodium hypochlorite) produces non-oxidizing chloride and sulfate species, thereby blocking oxidation of downstream ion exchange resins and membranes by residual oxidizing agent 142. The first absorber 250 may use disposable single-use absorbents (e.g., for low arsenic content brines) or regenerable absorbents (e.g., for high arsenic content brines). In embodiments, in which the first absorber 250 uses regenerable absorbents, the absorbent may be periodically regenerated with the NaOH 114 and NaCl brine (e.g., from the first stage ED concentrate 228). A first arsenic-rich stream 254 may be mixed with a ferric chloride solution (FeCl$_3$) to generate ferric arsenate. The ferric arsenate may be removed from the first arsenic-rich brine stream 254 with a fifth filter 256, thereby generating a filtered arsenic lean stream 258. The filtered arsenic lean stream 258 is greater than approximately 98% NaCl. The filtered arsenic lean stream 258 is recycled back through the first absorber 250, which removes additional arsenic from the regenerable absorbent.

A first concentrated brine stream 262 from the absorber 250 is fed to a third NF system 264, which removes greater than approximately 90% residual sulfate, greater than approximately 75% residual calcium and magnesium, and less than approximately 25% of chloride from the first concentrated brine stream 262. The third NF system 264 may include at least 2 NF stages. A third NF permeate stream 268 is fed to a second RO system 270 (e.g., seawater RO system) and a third NF non-permeate stream 274 is directed to the mineral removal system 32. The third NF non-permeate stream 274 includes the residual sulfate, calcium, magnesium, and chloride from the ED concentrate stream 146, which are recovered as gypsum 46 and Mg(OH)$_2$ 54 in the mineral removal system 32. In certain embodiments, the third NF non-permeate stream 274 is mixed with the second softener effluent stream 200 upstream of the second NF system 206. In other embodiments, the third NF non-permeate 274 is fed to the anti-scalant recovery ED system 198.

The third NF permeate stream 268 has a low sulfate content (e.g., approximately 0.1-0.5 g/L (100-500 ppm)) and more than approximately 3% chloride (e.g., approximately 40 g/L (40,000 ppm) to 60 g/L (60,000 ppm) NaCl). As such, the NF permeate stream 268 may be used to produce the HCl 72, 108 and the NaOH 70, 114. For example, the second RO system 270 separates the third NF permeate stream 268 into a second concentrated RO permeate stream 276 (e.g., having between approximately 75 g/L (75,000 ppm) and approximately 115 g/L (115,000 ppm) NaCl) and a second RO permeate stream 278 (e.g., having less than approximately 1 g/L (1000 ppm) NaCl low salinity stream). The NaCl in the second RO concentrated brine stream 276 is high purity NaCl having greater than approximately 99 wt % NaCl. Therefore, the second RO concentrated brine stream 276 may be used to generate NSF 60 certified caustic (e.g., the NaOH 70, 114) and HCl (e.g., the HCl 72, 108), according to the National Sanitation Foundation (NSF) Standard 60 (NSF 60). Because the system 10 is configured to generate NSF 60 certified NaOH and HCl during operation, costs associated with the purchase of NSF 60 certified NaOH and HCl may be reduced.

The second RO permeate stream 278 may be used as makeup water (e.g., makeup water 148, 150) for several processes within the system 10. For example, in one embodiment, the second RO permeate stream 278 may be fed to the anti-scalant recovery ED system 198 (e.g., the second and third stage ED units 220 and 224), as illustrated by arrow 148. In certain embodiments, the second RO permeate stream 278 may be fed to the first ED system 138, as illustrated by arrow 150. In addition, the second RO permeate stream 278 may be fed to both the ED systems 138, 198. The second RO permeate stream 278 may also be used as cooling tower makeup and other non-potable water uses (e.g., wash water, irrigation, etc.).

The HCl and NaOH production system 66 also includes several EDBM units 280, 282, and 284 (e.g., Electromat Electrodialysis and Bipolar Electrodialysis manufactured by GE Power and Water of Trevose, Pa.) that enable production of the HCl 72, 108 and NaOH 70. The EDBM units 280, 282, and 284 may be three cell membranes including a brine compartment 290, an acid compartment 292, and a caustic compartment 294. In the illustrated embodiment, the EDBM unit 280 receives the second RO concentrated permeate stream 276 from the second RO system 270. In addition to receiving the second RO concentrated permeate stream 276, the EDBM unit 280 also receives makeup HCl 298 (having approximately 0.5 wt % to approximately 4 wt % HCl) and makeup NaOH 300 (having approximately 0.5 wt % to approximately 4 wt % NaOH) from the EDBM unit 282 (e.g., makeup EDBM) to facilitate production of the HCl 108 and NaOH 114. Within the EDBM unit 280 (e.g., export EDBM), chloride is extracted from the second RO concentrated permeate stream 276 to produce a first HCl stream 302 (e.g., approximately 4 wt % to approximately 7 wt % HCl) and a first NaOH stream 304 (e.g., approximately 5 wt % to 12 wt % NaOH). The first HCl stream 302 is fed to an HCl evaporator 308 and the NaOH stream 304 is fed to an NaOH evaporator 310 (e.g., a vacuum evaporator). A first EDBM brine stream 314 may be combined with the first concentrated brine stream 262 to mitigate buildup of residual sulfate.

The evaporators 308, 310 concentrate the first HCl stream 302 and the first NaOH stream 304, respectively, thereby generating the industrial grade HCl 72 (between approximately 15 wt % to approximately 20 wt % HCl) and the industrial grade NaOH 70 (between approximately 30 wt % and approximately 50 wt % NaOH). As should be noted, at least a portion of the first HCl stream 302 and the first NaOH stream 302 may be used to provide the HCl 108 and NaOH 114, respectively, to the various streams and components of the system 10. In certain embodiments, the HCl evaporator 308 is a mechanical vapor recompression (MVR) evaporator system. The MVR evaporator system includes a condenser and a compressor. During concentration of the first HCl stream 302, the HCl evaporator 308 generates water vapor. The water vapor and HCl may form an azeotrope, resulting in the presence of HCl in the water vapor. Therefore, a portion of the makeup water 150 from the second RO system 270 may be fed to the HCl evaporator 308, as illustrated by arrow 316. The portion of the makeup water 316 may be used as scrubbing water for removal of HCl from the water vapor. Removing HCl from the water vapor may mitigate undesirable effects of HCl on other components of the evaporator 308 (e.g., the compressor). In certain embodiments, spent scrubbing water 318 (having approximately less than 1 wt % HCl) may be routed to the acid compartment 292 of the EDBM 284 and used as makeup acid for the production of a second HCl stream 320. The second HCl stream 320 may be fed to the acid compartment 292 of the EDBM 282, thereby facilitating production of the makeup HCl 298 provided to the EDBM 280. In other embodiments, the spent scrubbing water 318 may form part of the HCl 108.

Similar to the HCl evaporator 308, the NaOH evaporator 310 (e.g., a vacuum evaporator) generates a water vapor stream 326 during concentration of the first NaOH stream 310. The water vapor stream 326 may be fed to the heat exchanger 107 to heat the first softener effluent stream 98 upstream of the stripper 100. After transferring heat in the heat exchanger 107, the condensed water vapor may be fed to the EDBM 280 as makeup water.

As discussed above, the first stage ED concentrated stream 228 is routed to the HCl and NaOH production system 66 to facilitate production of the HCl 72, 108 and NaOH 70, 114. The first stage ED concentrated stream 228 may have a large amount of NaCl (e.g. between approximately 30 g/L (30,000 ppm) and approximately 60 g/L (60,000 ppm) NaCl), which may be used by the EDBM units 280, 282, and 284 to generated HCl and NaOH. Accordingly, the first stage ED concentrated stream 228 may be fed to the brine compartment 290 of the EDBM unit 282. The EDBM unit 282 may use the first stage ED concentrated stream 228 to generate the HCl makeup 298 and NaOH makeup 300 fed to the respective compartments 292, 294 of the EDBM unit 280. However, prior to feeding the first stage ED concentrated stream 228 to the EDBM unit 282, the first stage ED concentrated stream 228 may be treated with the oxidizing agent 142 to ionize arsenate and enable removal of the arsenate in a second absorber 330. The second absorber 330 operates similarly to the first absorber 250 discussed above. The second absorber 330 may operate at a pH of between approximately 5 and approximately 6. The pH in the second absorber in combination with a residence time of between approximately 1 minute and approximately 5 minutes may minimize co-absorption of silica (approximately 0.01 g/L (100 ppm) silica) in the stream 228. In certain embodiments, the stream 228 may be treated with sodium bisulfate ($NaHSO_4$) to remove residual oxidizing agent 142 before removal of the arsenic in the second absorber 330. A second arsenic-rich stream 334 is combined with the first arsenic-rich stream 254 and fed to the fifth filter 256 to generate the arsenic-lean stream 258, as discussed above. A third concentrated brine stream 336 is fed to the EDBM unit 282, thereby generating the HCl and NaOH makeup streams 306 and 308, respectively, and a second EDBM brine stream 338. The sections 292, 294 of the EDBM unit 282 also receive a third HCl stream 240 from the EDBM unit 284 and a mixture of the second RO permeate stream 278 (makeup water), as illustrated by arrow 342, and caustic condensate from the NaOH evaporator 304, respectively.

The second EDBM brine stream 338 (having between approximately 15 g/L (15,000 ppm) and approximately 50 g/L (50,000 ppm) NaCl) is fed to the EDBM unit 284 (e.g., an internal NaOH consumption EDBM). Additionally, the acid compartment 292 of the EDBM unit 284 receives the spent scrubbing water 318 from the HCl evaporator 308 to enable production of the third HCl stream 240. The caustic compartment 294 of the EDBM unit 284 is fed a third EDBM brine stream 350 generated in the brine compartment 290 of the EDBM 284. The third EDBM brine stream 350 may have less than approximately 5 g/L (5,000 ppm) NaCl, and enables production of the NaOH 114 used to regenerate the softeners 96, 192 and to adjust the pH of various streams within the system 10.

Present embodiments also include a method that utilizes the first ion exchange softener 96 to remove hardness and divalent elements/compounds from the brine stream 30 upstream of the first NF unit 120 and the mineral removal system 32. The HCl and NaOH production system 66 may feed HCl and NaOH to regenerate the first ion exchange softener 96 and enable recovery of the hardness and divalent elements/compounds. In this way, the operational costs of the system 10 may be decreased due, in part, to the use of less expensive non-selective membranes in the ED systems 138, 198 (compared to higher cost ion selective membranes), recovery of the anti-scalant 124, and production of NSF 60 certified HCl and NaOH (e.g., HCl 72, 108 and NaOH 70, 114). FIG. 4 is a flow diagram of a method 360 by which a wastewater treatment system (e.g., the wastewater treatment system 10 described above) may remove hardness and divalent elements from a brine stream (e.g., the brine stream 30), recover anti-scalant (e.g., the anti-scalant 124), and generate HCl and NaOH (e.g., the HCl 72, 108 and NaOH 70, 114). In certain embodiments, the first RO system 20 supplies the first ion exchange softener 96 with the brine stream 30 to generated the first softener effluent stream 98 and the concentrated chloride brine stream 106 (block 362), as described above with reference to FIG. 2. The first ion exchange softener 96 removes Ca, Mg, Fe, Mn, Sr, Ba and other hardness compounds from the brine stream 30. In addition, the first ion exchange softener 96 converts bicarbonate to $CO_2$. Therefore the amount of HCl 108 used in the system 10 may be decreased. For example, in general, the brine stream 30 is treated with HCl to convert the bicarbonate to $CO_2$. However, because the first ion exchange softener 96 is configured to convert the bicarbonate to $CO_2$, the brine stream 30 may not need to be treated with HCl, thereby reducing HCl usage.

The method 360 also includes treating the first softener effluent stream 98 with the anti-scalant 124 (block 364) and directing the first softener effluent stream 98 to the first NF system 120 and the first ED system 138 to generate desalinated water 28 and the ED concentrate stream 146 (block 368). In certain embodiments, the first softener effluent stream 98 includes silica ($SiO_2$) that may cause scaling during desalination of the first softener effluent stream 98 in the NF system 120. Therefore, the first softener effluent stream 98 may be treated with the anti-scalant 124 to mitigate scaling. The first NF system 120 removes sulfate ($SO_4$) from the first softener effluent stream 98, and the first ED system 138 removes greater than approximately 95% of NaCl from the first softener effluent stream 98, thereby generating the desalinated water 28 and the ED concentrate stream 146 (NaCl brine). Because most of the hardness and divalent compounds (e.g., greater than approximately 98%) are removed in the first ion exchange softener 96, the first ED system 138 may use less expensive non-selective membranes to desalinate the water (e.g., from the brine stream 30)

The method 360 further includes feeding the first concentrated brine stream 110 to the mineral removal system 32 and recovering the hardness and divalent elements/compounds (block 372). For example, the first concentrated brine stream 110 is fed to the magnesium hydroxide removal system 154 to recover the magnesium from the first concentrated brine stream 110, thereby generating the magnesium hydroxide 54. Overflow from the magnesium hydroxide removal system 154 is fed to the gypsum recovery system 160 to recover calcium and sulfate, thereby producing the gypsum 46. The magnesium hydroxide 54 and the gypsum 46 may be sold as industrial grade products.

The method 360 also includes supplying the first NF non-permeate stream 136 to the mineral removal system 32 and recovering the anti-scalant 124 to generate a NaCl brine (e.g., the first stage ED concentrate stream 226) (block 374). The recovered anti-scalant 124 may be recirculated throughout the system 10, thereby decreasing costs associated with the purchase of the anti-scalant 124. In certain embodiments, the anti-scalant 124 may be sold as an industrial grade anti-scalant.

The method 360 also includes supplying NaCl brine streams (e.g., the ED concentrate stream 146 and the first stage ED concentrate stream 226) from the first ED system 138 and the anti-scalant recovery ED system 198 to the HCl and NaOH production system 66 to generate HCl and NaOH (e.g., HCl 72, 108 and NaOH 70, 114) (block 378). For example, the HCl and NaOH production system 66 includes the systems 264, 274 and EDBM units 280, 282, 284 that facilitate production of the HCl, 72, 108 and NaOH 70, 114, as discussed above with reference to FIG. 3. The HCl 72, 108 and NaOH 70, 114 generated by the HCl and NaOH production system 66 are NSF 60 certified quality. The produced HCl and NaOH may be recirculated throughout the system 10 (e.g., the HCl 108 and NaOH 114) and/or may be sold as high purity industrial grade HCl 72 and NaOH 70. Because the system 10 may use the HCl 108 and NaOH 114 generated by the HCl and NaOH production system 66, costs associated with the purchase of NSF 60 certified HCl and NaOH may be reduced.

The method 360 further includes directing the HCl 108 and NaOH 114 to the softeners 96, 192 to generate the first concentrated brine stream 110 and to regenerate the softeners 96, 192. In this way, the system 10 may continue to remove and recover the hardness and divalent compounds as industrial grade products.

As described above, certain embodiments of the water processing system 10 use ion exchange softeners (e.g., the softeners 96, 192) to generate softener effluent streams (e.g., streams 98, 200) upstream of nanofiltration and electrodialysis systems. In this way, hardness and divalent ions may be removed from brine streams before nanofiltration and electrodialysis, thereby enabling the use of lower cost non-selective membranes in the electrodialysis systems (e.g., the ED systems 138, 198). Moreover, the ion exchange softeners 96, 192 may convert bicarbonate in the brine stream (e.g., the brine stream 30) to $CO_2$, thereby decreasing an amount of HCl used by the system 10 to convert the bicarbonate to $CO_2$ 104. Additionally, the water processing system 10 may recover and recycle anti-scalant (e.g., the anti-scalant 124) and generate NSF certified HCl and NaOH. Therefore, costs associated with the purchase of anti-scalant, HCl, and NaOH may be reduced. Accordingly, the total operation cost of the system 10 may also be reduced.

While only certain features of the disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A system, comprising:
an ion exchange softener fluidly coupled to a wastewater treatment system, wherein the ion exchange softener is configured to receive a first brine stream from the wastewater treatment system and to remove a plurality of minerals from the first brine stream to generate a second brine stream and a third brine stream, wherein the second brine stream comprises the plurality of minerals;
a mineral removal system disposed downstream from the ion exchange softener and configured to receive the second brine stream and to generate a sodium chloride (NaCl) brine stream;
an acid and caustic production system disposed downstream from and fluidly coupled to the mineral removal system, wherein the acid and caustic production system comprises a first electrodialysis (ED) system configured to receive the NaCl brine stream via a first conduit from the mineral removal system and to generate hydrochloric acid (HCl) and sodium hydroxide (NaOH) from the NaCl brine stream; and
a second ED system disposed downstream from the ion exchange softener and upstream of the acid and caustic production system, wherein the second ED system is fluidly coupled to the ion exchange softener and to the acid and caustic production system, the second ED system is configured to generate desalinated water from the third brine stream, the second ED system is configured to generate an ED concentrate stream from the third brine stream, the second ED system is configured to direct the ED concentrate stream to the acid and caustic production system, and the acid and caustic production system is configured to receive the ED concentrate stream via a second conduit.

2. The system of claim 1, comprising an anti-scalant recovery system within the mineral removal system, wherein the anti-scalant recovery system is configured to generate the NaCl brine stream.

3. The system of claim 2, wherein the anti-scalant recovery system comprises a plurality of ED units.

4. The system of claim 2, wherein the anti-scalant recovery system is fluidly coupled to the first ED system and configured to feed the NaCl brine stream to the first ED system.

5. The system of claim 1, comprising a nanofiltration (NF) system disposed downstream from the ion exchange softener, wherein the NF system is fluidly coupled to the ion exchange softener, the second ED system, and an anti-scalant recovery system, and wherein the NF system is configured to direct an NF non-permeate stream to the anti-scalant recovery system to generate the NaCl brine stream from the third brine stream, and the NF system is configured to generate an NF permeate stream from the third brine stream, and wherein the NF system is configured to direct the NF permeate stream to the second ED system to generate the desalinated water and the ED concentrate stream.

6. The system of claim 1, wherein the second ED system comprises a non-selective membrane.

7. The system of claim 1, wherein the ion exchange softener comprises a resin, the resin comprises an acid portion and a neutral portion, and the acid portion is configured to remove bicarbonate from the first brine stream.

8. The system of claim 1, comprising a first mineral removal section disposed within the mineral removal system, wherein the first mineral removal section is fluidly coupled to the ion exchange softener and configured to receive the second brine stream, and wherein the first mineral removal section is configured to remove a first portion of the plurality of minerals from the second brine stream to generate a fourth brine stream comprising a second portion of the plurality of minerals, and the first mineral removal section comprises a magnesium hydroxide removal section.

9. The system of claim 8, comprising a second mineral removal section within the mineral removal system, wherein the second mineral removal section is configured to remove the second portion of the plurality of minerals from the fourth brine stream, and the second mineral removal section comprises a gypsum removal section.

10. A system, comprising:
an ion exchange softener fluidly coupled to a wastewater treatment system, wherein the ion exchange softener is configured to receive a first brine stream from the wastewater treatment system and to remove a plurality of minerals from the first brine stream to generate a second brine stream and a third brine stream, wherein the second brine stream comprises the plurality of minerals;
a mineral removal system disposed downstream from the ion exchange softener, wherein a portion of the mineral removal system is configured to receive the second brine stream and to generate a first sodium chloride (NaCl) brine stream;
a nanofiltration (NF) system within the mineral removal system, wherein the NF system is configured to remove a sulfate from the first NaCl brine stream to generate a second NaCl brine stream; and
an anti-scalant recovery system within the mineral removal system, wherein the anti-scalant recovery system is configured to remove anti-scalant from the second NaCl brine stream to generate an anti-scalant stream and a third NaCl brine stream, and the anti-scalant recovery system comprises at least one electrodialysis (ED) system.

11. The system of claim 10, wherein the at least one ED system comprises a plurality of ED systems.

12. The system of claim 10, comprising an acid and caustic production system disposed downstream from the mineral removal system, wherein the acid and caustic production system comprises a second ED system configured to receive the third NaCl brine stream from the anti-scalant recovery system and to generate hydrochloric acid (HCl) and sodium hydroxide (NaOH) from the third NaCl brine stream.

13. The system of claim 12, wherein the anti-scalant recovery system is configured to receive a makeup water stream from the acid and caustic production system and to generate the anti-scalant stream using the makeup water stream.

14. The system of claim 10, wherein anti-scalant recovery system is configured to direct the anti-scalant stream into the third brine stream to generate a treated third brine stream.

15. A system, comprising:
an ion exchange softener fluidly coupled to a wastewater treatment system, wherein the ion exchange softener is configured to receive a first brine stream from the wastewater treatment system and to remove a plurality of minerals from the first brine stream to generate a second brine stream and a third brine stream, wherein the second brine stream comprises the plurality of minerals, and the ion exchange softener is configured to output the second brine stream to a mineral removal system via a first conduit;

a nanofiltration (NF) system fluidly coupled to the ion exchange softener, wherein the NF system is configured to receive the third brine stream via a second conduit, and the NF system is configured to generate an NF permeate stream and an NF non-permeate stream;

a first electrodialysis (ED) system fluidly coupled to the NF system, wherein the first ED system is configured to receive the NF permeate stream and to generate desalinated water and a sodium chloride (NaCl) brine stream from the NF permeate stream, and the first ED system is not directly fluidly coupled to the mineral removal system; and an acid and caustic production system disposed downstream from and fluidly coupled to the first ED system, wherein the acid and caustic production system comprises a second ED system configured to receive the NaCl brine stream from the first ED system and to generate hydrochloric acid (HCl) and sodium hydroxide (NaOH) from the NaCl brine stream.

16. The system of claim 15, comprising the mineral removal system disposed downstream from the ion exchange softener, wherein a portion of the mineral removal system is configured to receive the second brine stream and to generate a second NaCl brine stream.

17. The system of claim 16, wherein the mineral removal system comprises an anti-scalant recovery system, and the anti-scalant recovery system is configured to generate an anti-scalant stream from the second NaCl brine stream.

18. The system of claim 16, wherein the ion exchange softener is fluidly coupled to the acid and caustic production system, and the ion exchange softener is configured to receive the HCl and the NaOH to regenerate the ion exchange softener.

19. The system of claim 15, wherein the first ED system comprises a non-selective membrane.

* * * * *